United States Patent [19]

Monagas

[11] Patent Number: 5,524,928
[45] Date of Patent: Jun. 11, 1996

[54] AUTOMOBILE RESTRAINT SYSTEM

[76] Inventor: Guy Monagas, 123 Birch Trail, Kennesaw, Ga. 30144

[21] Appl. No.: 278,248

[22] Filed: Jul. 21, 1994

[51] Int. Cl.$^6$ .................................................. B60R 22/00
[52] U.S. Cl. ........................................ 280/808; 297/484
[58] Field of Search .............................. 280/801.1, 808; 297/483, 484, 486

[56] References Cited

U.S. PATENT DOCUMENTS

| | | | |
|---|---|---|---|
| 4,231,616 | 11/1980 | Painter | 297/481 |
| 4,302,049 | 11/1981 | Simpson | 297/484 |
| 5,026,225 | 6/1991 | McIntyre | 410/23 |
| 5,131,683 | 7/1992 | Johnson | 280/808 |
| 5,306,044 | 4/1994 | Tucker | 280/801.1 |

*Primary Examiner*—Kenneth R. Rice

[57] ABSTRACT

An automobile restraint system for retaining a passenger relative to an automobile seat during deceleration of the vehicle, such as occurs in a crash. The system includes a pair of shoulder webs which extend from behind the seat over respective left and right shoulders of the passenger to connect with a central web fastened at the forward edge of the seat. A pair of retaining webs intersect the respective left and right shoulder webs and extend downwardly to respective left and right sides of the passenger or seat. The system engages the upper anterior portions of the thighs, and the shoulders of the passenger during deceleration, thereby precluding contact of the webs with the neck, chest, or central torso portions of the passenger.

4 Claims, 3 Drawing Sheets

AUTOMOBILE RESTRAINT SYSTEM

BACKGROUND OF THE INVENTION

1. Field of the Invention

The present invention relates to seatbelts and more particularly pertains to an automobile restraint system for retaining a passenger relative to an automobile seat during deceleration of the vehicle, such as occurs in a crash.

2. Description of the Prior Art

The use of seatbelts is known in the prior art. More specifically, seatbelts heretofore devised and utilized for the purpose of restraining a passenger within a vehicle are known to consist basically of familiar, expected and obvious structural configurations, notwithstanding the myriad of designs encompassed by the crowded prior art which have been developed for the fulfillment of countless objectives and requirements.

For example, a torso restraining assembly for an automobile seat is illustrated in U.S. Pat. No. 5,131,683 in which a Y-section of the assembly has a pair of straps extending from a rearward portion of the vehicle over the seat back and connect with a lap strap. When the passenger joins together the buckle and catch of the lap strap, the torso retaining assembly retains the torso of the passenger against the back of the vehicle seat.

Other known prior art seatbelt structures are disclosed in U.S. Pat. No. 4,832,367; U.S. Pat. No. 5,135,257; and U.S. Pat. No. 4,726,605.

While these devices fulfill their respective, particular objectives and requirements, the aforementioned patents do not disclose an automobile restraint system for retaining a passenger relative to an automobile seat during deceleration of the vehicle which includes a pair of shoulder webs extending from behind the seat over respective left and right shoulders of the passenger to connect with a central web fastened at the forward edge of the seat, and a pair of retaining webs which intersect the respective left and right shoulder webs and extend downwardly to respective left and right sides of the passenger or seat. Further, none of the known prior art seatbelts teach or suggest an automobile restraint system which engages the upper anterior portions of the thighs, and the shoulders of the passenger during deceleration, thereby precluding contact of the webs with the neck, chest and central torso portions of the passenger.

In these respects, the automobile restraint system according to the present invention substantially departs from the conventional concepts and designs of the prior art, and in so doing provides an apparatus primarily developed for the purpose of retaining a passenger relative to an automobile seat during deceleration of the vehicle, such as occurs in a crash.

SUMMARY OF THE INVENTION

In view of the foregoing disadvantages inherent in the known types of seatbelts now present in the prior art, the present invention provides a new automobile restraint system construction wherein the same can be utilized for retaining a passenger relative to an automobile seat during deceleration of the vehicle. As such, the general purpose of the present invention, which will be described subsequently in greater detail, is to provide a new automobile restraint system apparatus and method which has many of the advantages of the seatbelts mentioned heretofore and many novel features that result in a automobile restraint system which is not anticipated, rendered obvious, suggested, or even implied by any of the prior art seatbelts, either alone or in any combination thereof.

To attain this, the present invention generally comprises an automobile restraint system for retaining a passenger relative to an automobile seat during deceleration of the vehicle, such as occurs in a crash. The system includes a pair of shoulder webs which extend from behind the seat over respective left and right shoulders of the passenger to connect with a central web fastened at the forward edge of the seat. A pair of retaining webs intersect the respective left and right shoulder webs and extend downwardly to respective left and right sides of the passenger or seat. The system engages the upper anterior portions of the thighs, and the shoulders of the passenger during deceleration, thereby precluding contact of the webs with the neck, chest, or central torso portions of the passenger.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automobile restraint system apparatus and method which has many of the advantages of the seatbelts mentioned heretofore and many novel features that result in a automobile restraint system which is not anticipated, rendered obvious, suggested, or even implied by any of the prior art seatbelts, either alone or in any combination thereof.

It is another object of the present invention to provide a new automobile restraint system which may be easily and efficiently manufactured and marketed.

It is a further object of the present invention to provide a new automobile restraint system which is of a durable and reliable construction.

An even further object of the present invention is to provide a new automobile restraint system which is susceptible of a low cost of manufacture with regard to both materials and labor, and which accordingly is then susceptible of low prices of sale to the consuming public, thereby making such automobile restraint systems economically available to the buying public.

Still yet another object of the present invention is to provide a new automobile restraint system which provides in the apparatuses and methods of the prior art some of the advantages thereof, while simultaneously overcoming some of the disadvantages normally associated therewith.

Still another object of the present invention is to provide a new automobile restraint system for restraining a passenger relative to an automobile seat during deceleration of the vehicle.

Yet another object of the present invention is to provide a new automobile restraint system which includes a pair of shoulder webs that extend from behind the seat over respective left and right shoulders of the passenger to connect with a central web fastened to the forward edge of the seat, and a pair of retaining webs which intersect the respective left and right shoulder webs and extend downwardly to respective left and right sides of the passenger or seat.

Even still another object of the present invention is to provide a new automobile restraint system which engages the upper anterior portions of the thighs, and the shoulders of the passenger during deceleration thereby precluding contact of the webs with the neck, chest and central torso portions of the passenger.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
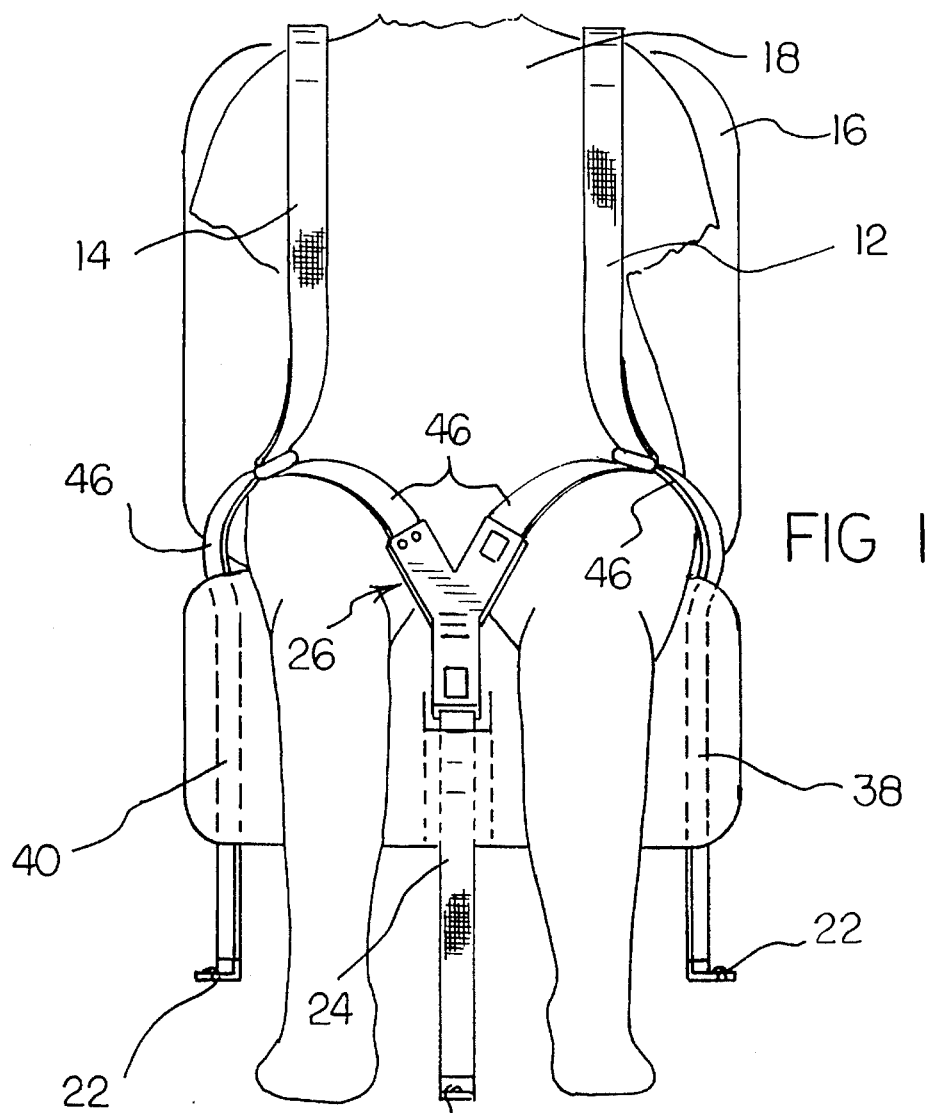
FIG. 1 is a front elevational view of an automobile restraint system comprising the present invention.

With reference now to the drawings, and in particular to FIGS. 1–5 thereof, a new automobile restraint system embodying the principles and concepts of the present invention and generally designated by the reference numeral 10 will be described.

Figure 3:
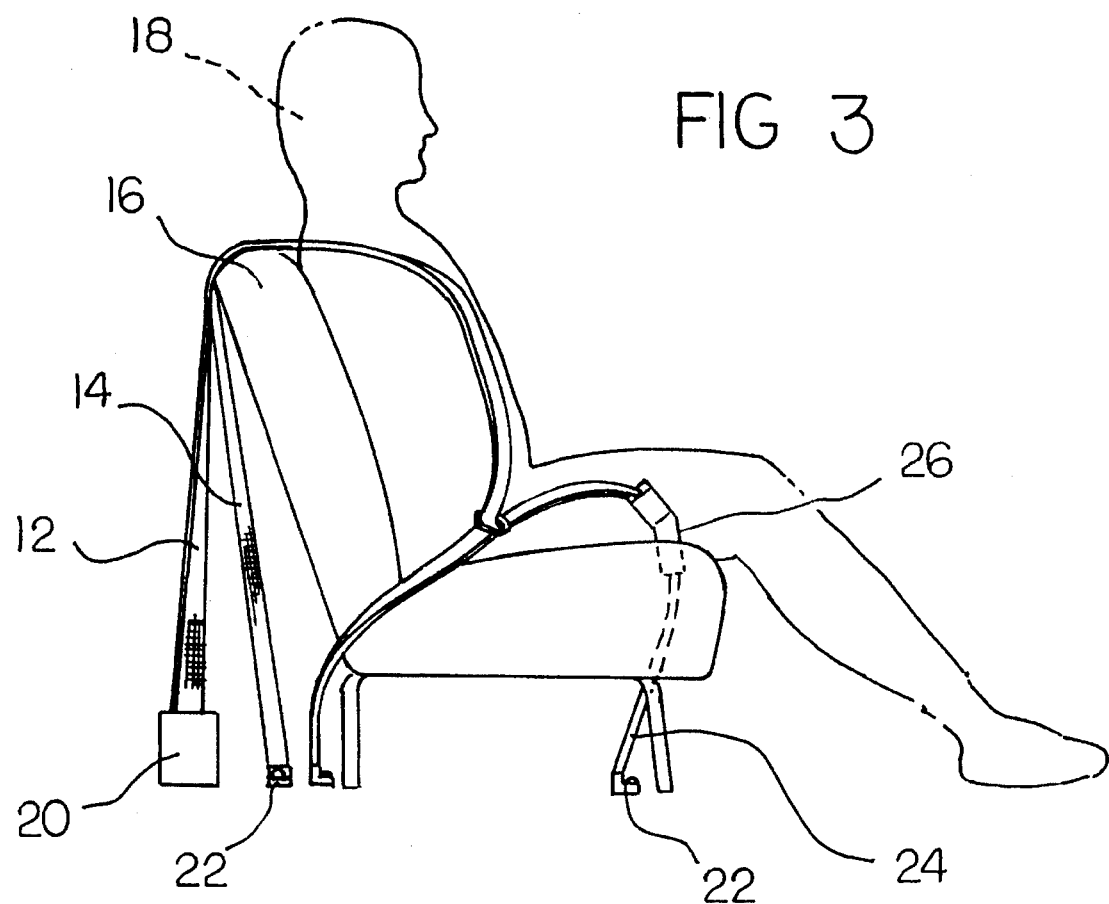
FIG. 3 is a side elevation view of the restraint system.
Figure 4:
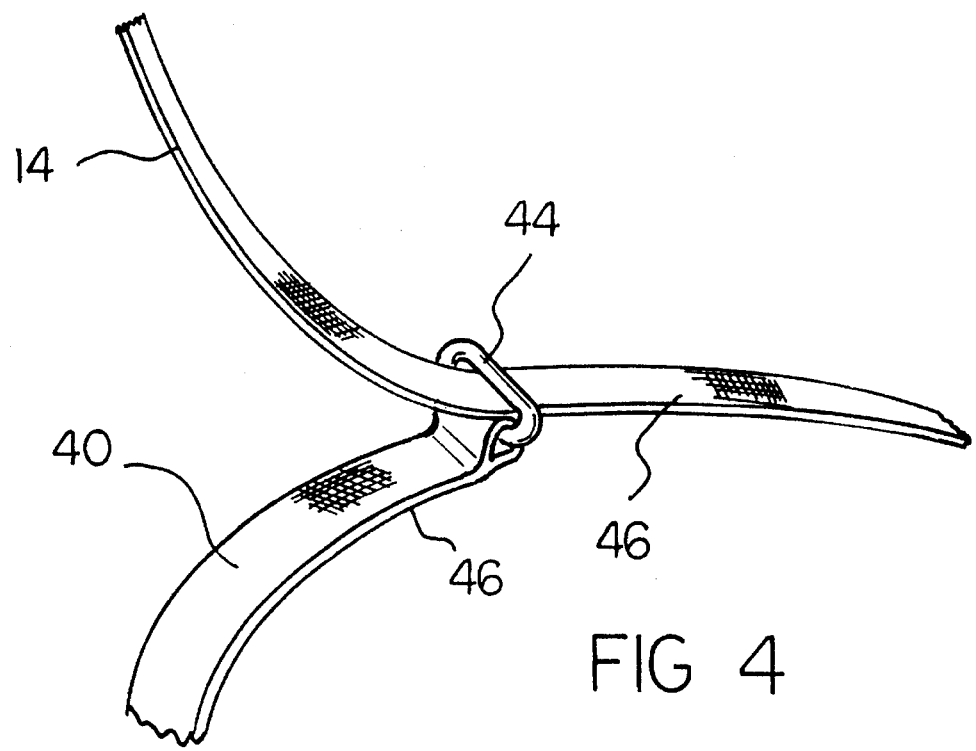
FIG. 4 is a further enlarged orthographic view of a further portion of the present invention.

More specifically, it will be noted that the automobile restraint system 10 comprises a left shoulder web 12 and a right shoulder web 14 which extend from a portion of a vehicle located rearwardly of the seat 16 of the vehicle and over the shoulders of a passenger 18 positioned within the seat. As illustrated in FIG. 3, the left shoulder web 12 may be provided with a conventionally known seat belt retractor 20, with the right shoulder web 14 being fastened to the floor of the automobile by a floor anchor 22. Thus, if an older vehicle is being retro-fitted with the automobile restraint system 10, the left shoulder web 12 and its associated retractor 20 of the original seatbelt system may be utilized. However, it is within the intent and purview of the present invention to couple the left and right shoulder webs 12, 14 to a portion of the vehicle located rearwardly of the seat 16 by using a pair of retractors 20 or a pair of floor anchors 22 or a combination of both, as shown in FIGS. 3 and 5.

Figure 2:
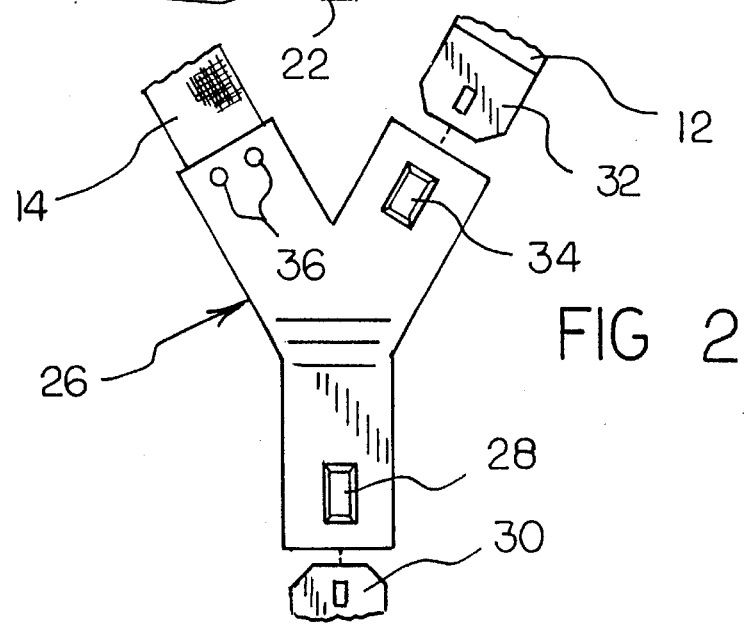
FIG. 2 is an enlarged orthographic view of portion of the present invention.

A center web 24 includes a floor anchor 22 which couples the center web to a portion of the vehicle floor located beneath a front edge of the seat 16, as best illustrated in FIGS. 1 and 3, by passing through an unlabeled sleeve extending through the seat. The center web 24 extends from the floor of the vehicle under the seat 16 to between the passenger's legs and terminates in a central connector 26 positioned between the knees of the passenger 18. As shown in FIGS. 2, the central connector 26 is releasably coupled to the center web 24 by a center web buckle 28 which engages a latch plate 30 coupled to the center web 24. Similarly, the left shoulder web 12 is provided with a latch plate 32 which is releasably couplable to a left shoulder web buckle 34 of the central connector 26. The right shoulder web 14 is coupled to the central connector 26 by a pair of rivets 36 or other similar fastening means. Although not specifically illustrated in FIG. 2, the right shoulder web 14 may also be provided with a latch plate and cooperable buckle, whereby the right shoulder web is releasably coupled to the central connector 26 in a manner similar to the joining of the center web 24 or the left shoulder web 12 to the central connector 26. By this structure, the shoulder webs 12, 14 may be coupled to the center web 24 as illustrated in FIG. 1.

Figure 5:
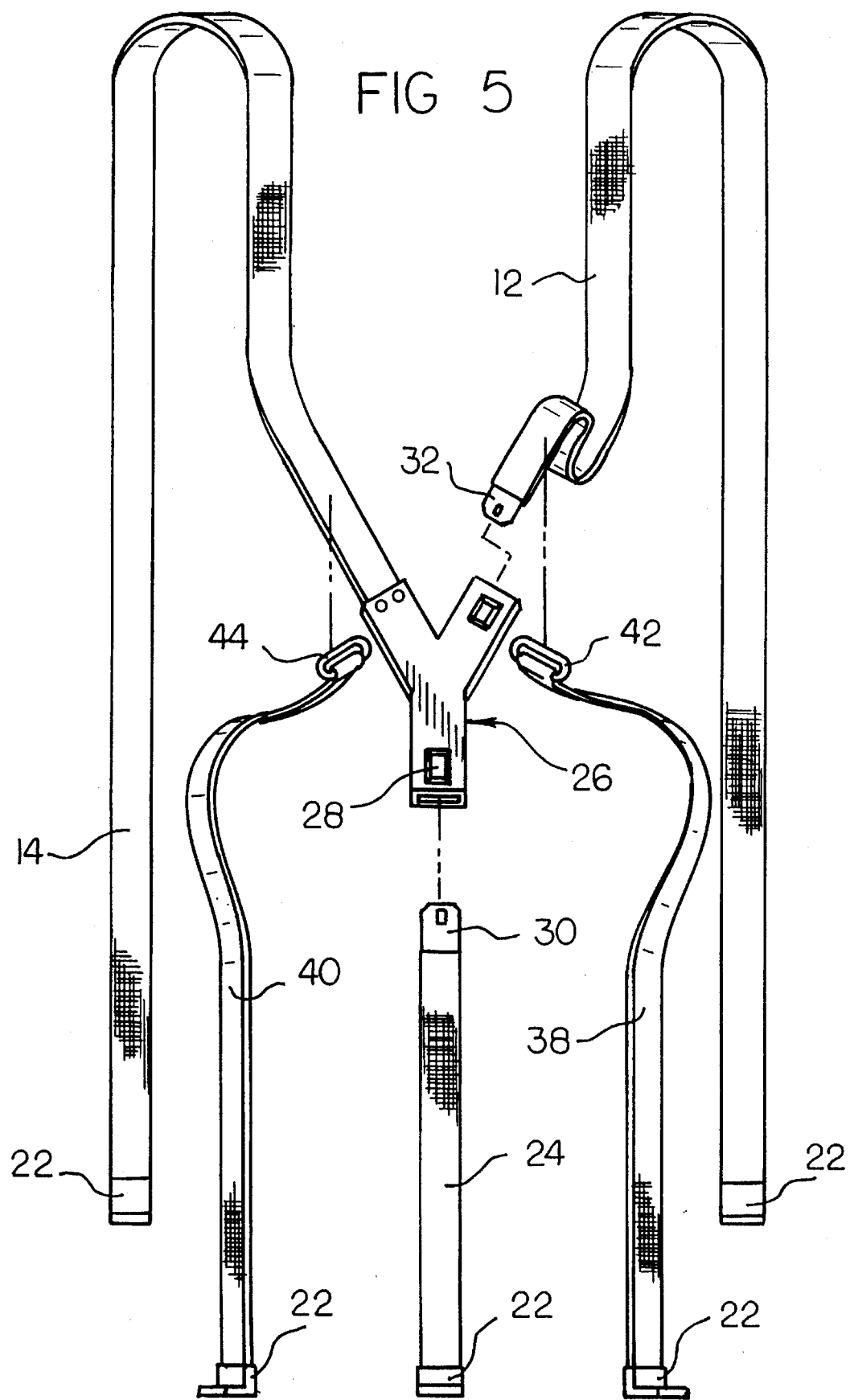
FIG. 5 is an exploded view of the invention.

As best illustrated in FIGS. 1, 3, and 5, a pair of retaining webs 38, 40 are fastened to respectively opposed left and right lateral areas of the vehicle floor by additional floor anchors 22. The retaining webs include a left retaining web 38 and a right retaining web 40 and are each provided with respective eyelets 42, 44 at distal ends thereof relative to the floor anchors 22. The eyelets 42, 44 slidably capture a portion of respective left and right shoulder webs 12, 14, thereby biasing the shoulder webs outward and downward to define thigh engaging portions 46 which contact upper anterior portions of the thighs of the passenger 18. Because the retaining webs 38, 40 are slidably coupled to the shoulder webs 12, 14 the restraining force of the thigh engaging portions 46 generated during deceleration of the vehicle is more evenly distributed between the shoulder webs and the retaining webs. Although not specifically illustrated, it is contemplated that the retaining webs 38, 40 may be provided with conventionally known seatbelt adjusting means for lengthening or shortening a length thereof, thereby imparting adjustability to the system 10 to accommodate various sized passengers 18.

During deceleration of the associated vehicle, such as occurs in a crash or other impact, the automobile restraint system 10 retains the passenger 18 within the automobile seat 16 by contacting and restraining the passenger 18 about the upper anterior portions of the thighs, and the shoulders, thereby precluding contact of the webs 12, 14 and 38, 40 with the passenger's neck, chest and central torso portion. Thus, a pregnant female may be restrained about the aforementioned portions of the body, with no force being applied to the woman's uterus and associated fetus.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An automobile restraint system for use with a vehicle having a seat to restrain a passenger within said seat, said system comprising:

a left shoulder web securable to a portion of said vehicle located rearwardly of said seat;

a right shoulder web securable to a portion of said vehicle located rearwardly of said seat, said shoulder webs being positionable over the shoulders of said passenger;

a center web securable to a portion of said vehicle located toward a forward edge of said seat, the center web being arranged to extend between the passenger's legs, said center web having a distal end;

a central connector coupled to said distal end of said center web, said central connector being coupled to both said left shoulder web and said right shoulder web;

a left retaining web couplable to a left lateral area of said vehicle, said left retaining web having a distal end coupled to a portion of said left shoulder web, thereby biasing said left shoulder web outward and downward to define thigh engaging portions of said left shoulder web and said left retaining web which contact upper anterior portions of the left thigh of said passenger;

and, a right retaining web couplable to a right lateral area of said vehicle, said right retaining web having a distal end coupled to a portion of said right shoulder web, thereby biasing said right shoulder web outward and defining thigh engaging portions of said right shoulder web and said right retaining web which contact upper anterior portions of the right thigh of said passenger.

2. The automobile restraint system as recited in claim 1, and further comprising a left shoulder web buckle for coupling said left shoulder web to said central connector, and a center web buckle for coupling said center web to said central connector.

3. The automobile restraint system as recited in claim 2, and further comprising a left eyelet coupled to said distal end of said left retaining web, said left eyelet extending around a portion of said left shoulder web to couple said left retaining web thereto, and a right eyelet coupled to said distal end of said right retaining web, said right eyelet extending around a portion of said right shoulder web to couple said right retaining web thereto.

4. The automobile restraint system as recited in claim 3, and further Comprising a retractor coupled to said left shoulder web.

* * * * *